United States Patent
Witt et al.

(10) Patent No.: US 8,429,424 B2
(45) Date of Patent: Apr. 23, 2013

(54) METHOD AND SYSTEM FOR ENCRYPTING FILES BASED ON SECURITY RULES

(75) Inventors: Russell A. Witt, Plano, TX (US);
Osvaldo A. Ridner, Folsom, CA (US);
John M. Casey, Carrollton, TX (US);
Timothy R. Bruce, Carrollton, TX (US);
David L. Helsley, Glastonbury, CT (US);
Gary Gregory, Lubbock, TX (US)

(73) Assignee: CA, Inc., Islandia, NY (US)

( * ) Notice: Subject to any disclaimer, the term of this patent is extended or adjusted under 35 U.S.C. 154(b) by 983 days.

(21) Appl. No.: 11/737,873

(22) Filed: Apr. 20, 2007

(65) Prior Publication Data
US 2008/0263355 A1 Oct. 23, 2008

(51) Int. Cl.
*H04L 29/06* (2006.01)

(52) U.S. Cl.
USPC .......................................... 713/193; 715/255

(58) Field of Classification Search .................... None
See application file for complete search history.

(56) References Cited

U.S. PATENT DOCUMENTS

| | | | | |
|---|---|---|---|---|
| 5,212,784 A * | 5/1993 | Sparks | ......................... | 714/6.12 |
| 5,699,428 A * | 12/1997 | McDonnal et al. | ........... | 713/165 |
| 6,049,723 A * | 4/2000 | Park | .............................. | 455/564 |
| 6,128,735 A * | 10/2000 | Goldstein et al. | ............. | 713/166 |
| 6,453,277 B1 | 9/2002 | Helsley et al. | ................... | 703/24 |
| 6,986,009 B1 | 1/2006 | Lecrone et al. | ............... | 711/162 |
| 7,117,055 B2 * | 10/2006 | Mateau et al. | .................. | 700/98 |
| 7,130,812 B1 * | 10/2006 | Iyer et al. | ......................... | 705/10 |
| 2004/0230792 A1 * | 11/2004 | McCarty | ....................... | 713/153 |
| 2005/0076293 A1 * | 4/2005 | Beresnevichiene | ........... | 715/514 |
| 2005/0131990 A1 * | 6/2005 | Jewell | ............................ | 709/201 |
| 2006/0010324 A1 * | 1/2006 | Appenzeller et al. | ......... | 713/171 |
| 2006/0010439 A1 * | 1/2006 | Majidian | ............................ | 718/1 |
| 2007/0242827 A1 * | 10/2007 | Prafullchandra et al. | ..... | 380/241 |

* cited by examiner

*Primary Examiner* — Edan Orgad
*Assistant Examiner* — Brian Olion
(74) *Attorney, Agent, or Firm* — Baker Botts, L.L.P.

(57) ABSTRACT

The present disclosure is directed to a method and system for encrypting files based on security rules. In accordance with a particular embodiment of the present disclosure, a request to store a file on a storage device is received. At least one security parameter associated with a security profile of the file is identified. It is determined whether to encrypt the file by applying at least one security rule to the security parameter. The security rule includes selection criteria. The file is encrypted if the security rule indicates the file should be encrypted. The file is stored on the storage device.

19 Claims, 1 Drawing Sheet

METHOD AND SYSTEM FOR ENCRYPTING FILES BASED ON SECURITY RULES

TECHNICAL FIELD

The present disclosure relates generally to data encryption, and more particularly to a method and system for encrypting files based on security rules.

BACKGROUND

Conventional mainframe systems often store large volumes of data on tapes. Tapes may be used for archival purposes as well as a primary storage medium for some mainframe systems. Lost or stolen tapes in transit between data centers and their off-site storage facilities may lead to losses that compromise personal and private data of individuals. Because of the critical and potentially devastating loss of this highly sensitive information, these losses could expose organizations to a wide range of problems, including fraud and identify theft.

SUMMARY

In accordance with the present invention, the disadvantages and problems associated with previous techniques for encrypting data may be reduced or eliminated.

In accordance with a particular embodiment of the present disclosure, a method for encrypting files based on security rules includes receiving a request to store a file on a storage device. The method also includes identifying at least one security parameter associated with a security profile of the file. The method further includes determining whether to encrypt the file by applying at least one security rule to the security parameter. The security rule includes selection criteria. The method further includes encrypting the file if the security rule indicates the file should be encrypted. The method further includes storing the file on the storage device.

Technical advantages of particular embodiments of the present disclosure include a system and method for encrypting files based on security rules that extend the control of file encryption to security administrators. Thus, security administrators may define security rules, separate from storage rules, that may determine what files are encrypted. The security rules may also indicate the encryption standard to be used to encrypt the files and the strength of the encryption standard.

Further technical advantages of particular embodiments of the present disclosure include a system and method for encrypting files based on security rules that provide a single point of control over file security. For example, security administrators may control such things as who owns a file, who is allowed to update and read the file, whether to encrypt the file, and the encryption standard.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF EXAMPLE EMBODIMENTS

Storage management generally refers to managing data on tape and disk devices. On a mainframe, for example, tapes may be used for many purposes such as backup or disaster recovery purposes. Data on tape may be lost, for example, while at a disaster recovery site or in transit from one data center to another. While tapes may be lost in transit, or misplaced and misfiled at disaster recovery sites, recent changes in laws require public disclosure when lost data relates to individual financial or medical information. This public disclosure requirement has forced many companies to attempt to protect all data that is not stored in a secure data center.

While some products (for example backup products) have started to address encryption for these purposes, they are often less than ideal. For example, some products allow encryption to be performed on a tape file based on storage rules. These storage rules may include selection criteria that are applied to storage parameters based on the file itself or the application creating the file, such as a parameter indicative of the name of the file. However, encryption is sometimes considered a function of security. Thus, these backup products do not offer a complete security solution because the determination of which files to encrypt is not based on parameters relating to security.

In accordance with the teachings of the present disclosure, a method for encrypting files based on security rules encrypts files based on parameters relating to security. For example, the security rules may include selection criteria that are applied to security parameters based on a security profile of a file, such as parameters indicative of user access permissions to the file. Thus, if the file has a particular permission setting, the method may determine to encrypt the file. In one embodiment, the security rules may indicate the encryption standard to be used to encrypt the file. In the embodiment, the security rules may also indicate the strength of the standard. Controlling encryption using security rules allows security administrators to control who may read and update files, and also control whether the files should be further protected through encryption if the file is to be stored on a storage device, such as a tape device.

The method and system for encrypting files based on security rules identified in this disclosure are not limited to any specific mainframe system. The examples illustrated in the accompanying figures will be described with reference to mainframes running IBM's zSeries/Operating System (z/OS). However, other well-known operating systems, including future operating systems may also be used.

Figure 1:
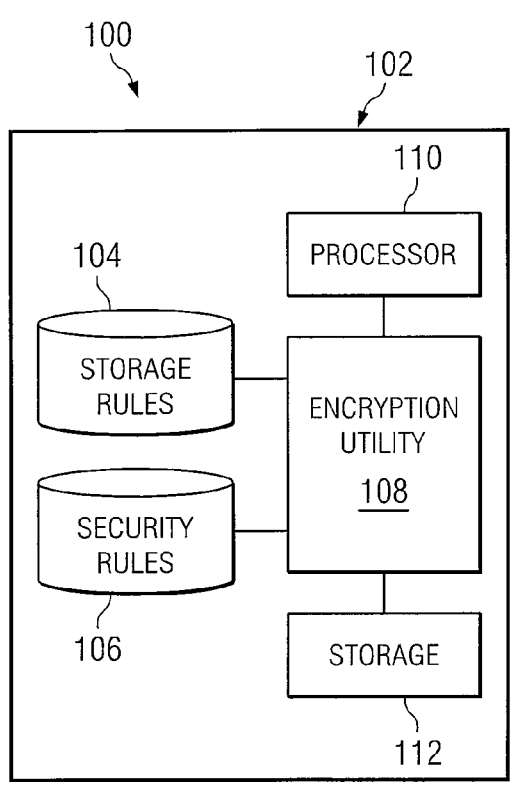
FIG. 1 is a block diagram illustrating a system for encrypting files based on security rules according to the teachings of the present disclosure.

FIG. 1 is a block diagram illustrating a system 100 for encrypting files based on security rules according to the teachings of the present disclosure. System 100 generally includes a server 102, a storage rules database 104, a security rules database 106, an encryption utility 108, a processor 110, and a storage device 112.

Server 102 may refer to any suitable device operable to process data. Examples of server 102 may include a mainframe, host computer, workstation, web server, file server, a personal computer such as a laptop, or any other device operable to process data. Although the present disclosure is discussed with reference to z/OS, server 102 may execute any of the other well-known MS-DOS, PC-DOS, MAC-OS, WINDOWS, UNIX, OpenVMS, or other appropriate operating systems, including future operating systems.

Storage rules database 104 and security rules database 106 may refer to any suitable devices operable to store data, and facilitate addition, modification, and retrieval of such data. Storage rules database 104 and security rules database 106 may refer to database systems used in a mainframe server running IBM z/OS. Storage rules database 104 and security rules database 106 may utilize data management systems, such as a relational database management system, to store data and relationships between tables.

Storage rules database 104 may include one or more storage rules that may be used to determine whether to encrypt a file. A storage rule may include selection criteria that are applied to storage parameters based on the file. In one embodiment, a storage rule may be applied to storage parameters based on the file, such as a parameter indicative of the name of the file, to determine whether to encrypt the file. For example, a first file may have a storage parameter indicative of the name of the first file: "payroll.doc," and a second file may have a storage parameter indicative of the name of the second file: "supplies.doc." A storage rule may include selection criteria that encrypts all files that have the letters "pay" in their name. In the example, applying the storage rule to the first file and the second file indicates that the first file should be encrypted but the second file should not be encrypted. Additionally, the present disclosure contemplates many types of storage rules. Various embodiments may include some, all, or none of the enumerated storage rules.

Security rules database 106 may include one or more security rules that may be used to determine whether to encrypt a file. A security rule may include selection criteria that are applied to security parameters related to security. In one embodiment, a security rule may include selection criteria that are applied to security parameters based on a security profile of the file, such as a parameter indicative of the permissions of the file, to determine whether to encrypt the file. For example, a first file may have a security parameter indicative of the permissions of the first file: "read/write access," and a second file may have a security parameter indicative of the permissions of the second file: "read-only access." A storage rule may include selection criteria that encrypts all files that have "read-only access" permission settings. In the example, applying the storage rule to the first file and the second file indicates that the first file should not be encrypted but the second file should be encrypted. As another example, if a file belongs to a user with special privileges, the rule may indicate the file should be encrypted. Additionally, the present disclosure contemplates many types of security rules. Various embodiments may include some, all, or none of the enumerated security rules.

The security rules stored in security rules database 106 may also indicate the encryption standard to be used to encrypt the file. For example, if a security rule indicates that a particular file should be encrypted, the security rule may also indicate that files matching the selection criteria should be encrypted using Advanced Encryption Standard (AES). In the example, the security rules may also indicate the strength of the standard. For example, the security rule may also indicate that the file should be encrypted using 128-bit AES encryption. Additionally, the present disclosure contemplates many types of encryption standards and strengths of the standards. Various embodiments may include some, all, or none of the enumerated standards and strengths of the standards.

Encryption utility 108 may refer to any suitable logic encoded on a non-transitory computer-readable medium operable to encrypt files through any suitable mechanism. In one embodiment, encryption utility 108 may utilize storage rules database 104 and security rules database 106 to determine whether to encrypt files. In the embodiment, encryption utility 108 may give preference to rules in security rules database 106. For example, if the rules in storage rules database 104 indicate that a particular file should not be encrypted, but the rules in security rules database 106 indicate that the particular file should be encrypted, then encryption utility 108 may give preference to the security rules and encrypt the particular file. In another embodiment, encryption utility 108 may utilize security rules database 106 without utilizing storage rules database 104 to determine whether to encrypt files. Encryption utility 108 may also have an interface to allow the creation and maintenance of rules in storage rules database 104 and security rules database 106.

Processor 110 may refer to any suitable device operable to execute instructions and manipulate data to perform operations for system 100. Processor 110 may include, for example, any type of central processing unit (CPU). In particular embodiments of the present disclosure, processor 110 may operate as one of the main processors on a mainframe system running z/OS.

Storage device 112 may refer to any suitable device operable for storing data and instructions. Storage device 112 may include, for example, a magnetic disk, flash memory, or optical disk, or other suitable storage device. In particular embodiments of the present disclosure, storage device 112 may be a tape device on a mainframe system running z/OS.

According to one embodiment of operation, encryption utility 108 gets control of an I/O transaction request between processor 110 and storage device 112 when a file is to be stored on storage device 112. Next, encryption utility 108 may determine whether the file being created should be encrypted. In one embodiment, encryption utility 108 may utilize storage rules database 104 to determine whether to encrypt files. For example, encryption utility 108 may utilize one or more storage rules that include selection criteria that are applied to storage parameters based on the file (such as file name, job name, etc.). In another embodiment, encryption utility 108 may utilize security rules database 106 to determine whether to encrypt files. For example, encryption utility 108 may utilize one or more security rules that include selection criteria that are applied to security parameters based on a security profile of the file (such as file permission settings, ownership, etc.). In yet another embodiment, encryption utility 108 may utilize both storage rules database 104 and security rules database 106 to determine whether to encrypt files. In the embodiment, encryption utility 108 may give preference to rules in security rules database 106. For example, if the rules in storage rules database 104 indicate that a particular file should not be encrypted, but the rules in security rules database 106 indicate that the particular file should be encrypted, then encryption utility 108 may encrypt the particular file based on the determination by the security rules.

If encryption utility 108 determines the file should not be encrypted, then the unencrypted file is written to storage device 112. If encryption utility 108 determines the file should be encrypted, then encryption utility 108 may use an encryption key to encrypt the file before it is written to storage device 112. The security rules may indicate the encryption standard to use and the strength of the standard. For example, if a security rule indicates that a particular file should be encrypted, the security rule may also indicate that files matching the selection criteria should be encrypted using 128-bit AES encryption. It should be understood that if encryption is to be performed, then encryption utility 108 may invoke other encryption applications to encrypt the file and perform one or more encryption techniques including encryption key tokens, key names, and key IDs, for example. After the file is encrypted, encryption utility 108 writes the encrypted file to storage device 112.

Thus, example embodiments of the present disclosure provide data encryption by enabling security administrators to control which files should be encrypted through security rules that may be external to storage rules. The security rules may also indicate the encryption standard to be used and the strength of the standard. Additional details of example embodiments of the present disclosure are described in detail below with reference to FIG. 2 and FIG. 3.

Figure 2:
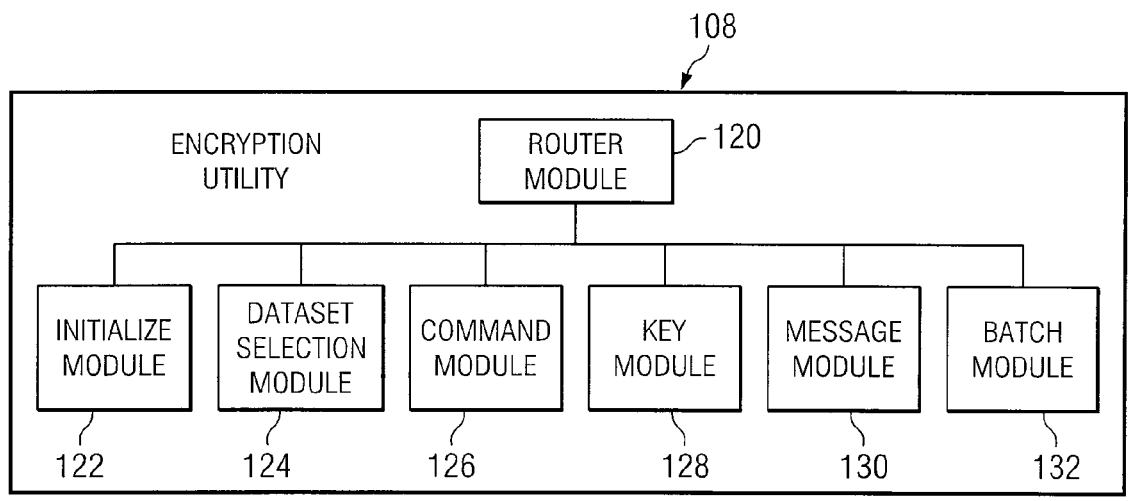
FIG. 2 is a block diagram illustrating an example encryption utility of the system of FIG. 1 according to an embodiment of the present disclosure.

FIG. 2 is a block diagram illustrating an example encryption utility 108 of the system of FIG. 1 according to an embodiment of the present disclosure. Encryption utility 108 may include various modules operable to perform various functions to encrypt a file, including a router module 120, an initialize module 122, a dataset selection module 124, a command module 126, a key module 128, a message module 130, and a batch module 132.

Router module 120 may provide a primary interface between the various modules in encryption utility 108. For example, if a program requests a particular security service, router module 120 may route the request to the appropriate module in encryption utility 108, such as initialize module 122. Initialize module 122 may perform one or more initialization routines such as locating a security table residing in common storage and allocating/formatting a control block for encryption. Dataset selection module 124 may contain control mechanisms to extract security profiles and determine if a file is eligible for encryption based on a security profile. Command module 126 may verify if a particular user has access to enter one of the protected commands for encryption. Key module 128 may determine whether the particular user has access to use the specified encryption key. Messages or report lines (generated by batch module 132) generated via security commands may be generated and processed in message module 130. Batch module 132 may provide a batch utility program that may be used as a command generator, system verification tool, and problem determination tool. It should be understood that some of the modules illustrated in FIG. 2 may be combined, modified, or removed where appropriate, and additional modules may be added to encryption utility 108 without departing from the scope of the disclosure. Additionally, as indicated above, the modules may be used in any suitable order without departing from the scope of the disclosure.

Figure 3:
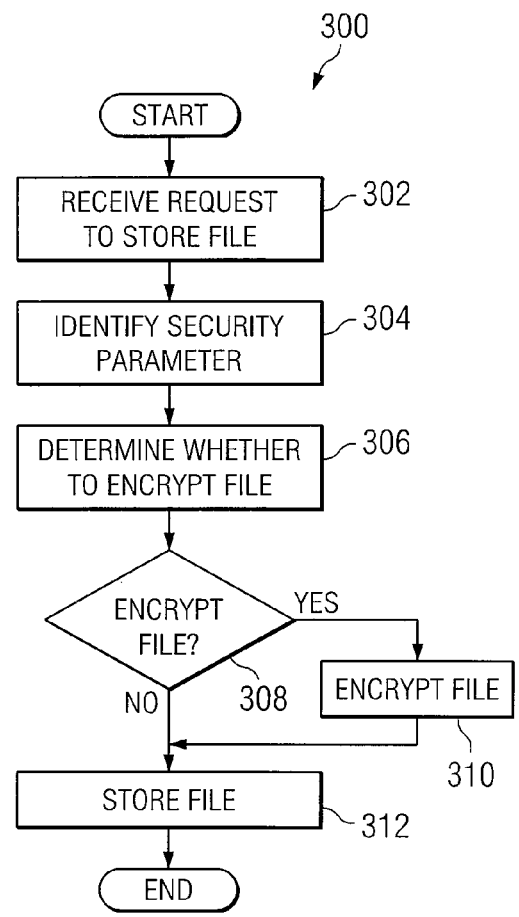
FIG. 3 is a flow diagram illustrating a method for encrypting files based on security rules according to an embodiment of the present disclosure.

FIG. 3 is a flow diagram illustrating a method for encrypting files based on security rules according to an embodiment of the present disclosure. The method begins at step 302 where a request to store a file on a storage device is received. At step 304, at least one security parameter associated with a security profile of the file is identified. At step 306, it is determined whether to encrypt the file by applying at least one security rule to the at least one security parameter. As described above, the at least one security rule includes selection criteria.

If at step 308, it is determined that the at least one security rule indicates the file should be encrypted, the file is encrypted at step 310 and stored on the storage device at step 312. If the file should not be encrypted, the unencrypted file is stored on the storage device at step 312.

It should be understood that some of the steps illustrated in FIG. 3 may be combined, modified, or deleted where appropriate, and additional steps may be added to the flowchart. Additionally, as indicated above, steps may be performed in any suitable order without departing from the scope of the invention.

Thus, the file encryption application defined by the method of FIG. 3 is designed to allow security administrators to control file encryption through security rules that may be external to storage rules. In one embodiment, the security rules may indicate the encryption standard to be used to encrypt the file. In the embodiment, the security rules may also indicate the strength of the standard. Therefore, security administrators have a single point of control over file security. For example, security administrators may control such things as who owns a file, who is allowed to update and read the file, whether to encrypt the file, and the encryption standard.

Numerous other changes, substitutions, variations, alterations and modifications may be ascertained by those skilled in the art and it is intended that the present disclosure encompass all such changes, substitutions, variations, alterations and modifications as falling within the spirit and scope of the appended claims. Moreover, the present disclosure is not intended to be limited in any way by any statement in the specification that is not otherwise reflected in the claims.

What is claimed is:

1. A method for encrypting files based on security rules, comprising:

receiving a request to store a tape file comprising backup data on a tape storage device;

maintaining a set of storage rules that are defined by a backup product operable to provide storage management of the up backup data, the set of storage rules identifying selection criteria for determining whether to encrypt the tape file based on at least one storage parameter associated with the storage of the tape file comprising the backup data;

maintaining a set of security rules identifying selection criteria for determining whether to encrypt the tape file based on at least one security parameter associated with a security profile associated with the tape file comprising the backup data, wherein the set of security rules are external to the set of storage rules and are defined by a security administrator, wherein the set of security rules identify whether the tape file should be encrypted based on who is allowed to access the file;

in response to applying the set of storage rules to the at least one storage parameter associated with the tape file, determining that the tape file should not be encrypted;

in response to applying the set of security rules to the at least one security parameter associated with the tape file, determining that the tape file should be encrypted based on a permission setting identifying who is allowed to access the file;

in response to applying both the set of storage rules and the set of security rules, encrypting the tape file such that preference is given to the at least one security rule defined by the security administrator over the at least on storage rule defined by the backup product where the set of storage rules identify that the tape file should not be encrypted and the set of security rules identify that the tap file should be encrypted; and storing the tape file on the tape storage device.

2. The method of claim 1, wherein the at least one security parameter comprises a parameter indicative of a permission setting of the tape file.

3. The method of claim 1, wherein the at least one security parameter comprises a parameter indicative of an owner of the tape file.

4. The method of claim 1, wherein the at least one security rule indicates an encryption standard.

5. The method of claim 1, further comprising:
identifying the at least one storage parameter associated with the tape file, wherein the at least one storage parameter comprises a parameter indicative of a name of the tape file; and
determining whether to encrypt the tape file by applying the at least one storage rule to the at least one storage parameter to determine if the name of the tape file includes a term that is identified by the at least one storage rule as requiring encryption.

6. A method for encrypting files based on security rules, comprising:
receiving a request to store a tape file comprising backup data on a tape storage device;
identifying at least one security parameter associated with a security profile of the tape file;
identifying at least one storage parameter associated with the tape file, wherein the at least one storage parameter comprises a parameter indicative of a name of the tape file;
determining whether to encrypt the tape file by applying at least one security rule to the at least one security parameter, the at least one security rule being defined by a security administrator and identifying whether the tape file should be encrypted based on who is allowed to access the file;
determining whether to encrypt the tape file by applying at least one storage rule to the at least one storage parameter, wherein the at least one storage rule is defined by a backup product operable to provide storage management of the up backup data, the set of storage rules external to the at least one security rule;
encrypting the tape file if the at least one security rule indicates the tape file should be encrypted; and
storing the tape file on the tape storage device;
wherein encrypting the tape file if the at least one security rule indicates the tape file should be encrypted further comprises encrypting the tape file if the at least one security rule defined by the security administrator indicates the tape file should be encrypted and the at least one storage rule defined by the storage product indicates the tape file should not be encrypted.

7. A system for encrypting files based on security rules, comprising:
a storage device; and
a processor, the processor operable to execute a program of instructions operable to:
receive a request to store a tape file comprising backup data on a tape storage device;
maintain a set of storage rules that are defined by a backup product operable to provide storage management of the up backup data, the set of storage rules identifying selection criteria for determining whether to encrypt the file based on at least one storage parameter associated with the storage of the file;
maintain a set of security rules identifying selection criteria for determining whether to encrypt the tape file based on at least one security parameter associated with a security profile associated with the tape file comprising the backup data, wherein the set of security rules are external to the set of storage rules and are defined by a security administrator, wherein the set of security rules identify whether the tape file should be encrypted based on who is allowed to access the file;
in response to applying the set of storage rules to the file parameter, determine that the tape file should not be encrypted;
in response to applying the set of security rules to the security parameter, determine that the tape file should be encrypted based on a permission setting identifying who is allowed to access the file;
in response to applying both the set of storage rules and the set of security rules, encrypt the tape file such that preference is given to the at least one security rule defined by, the security administrator over the at least on storage rule defined by the backup product where the set of storage rules identify that the tape file should not be encrypted and the set of security rules identify that the tap file should be encrypted; and
store the tape file on the tape storage device.

8. The system of claim 7, wherein the at least one security parameter comprises a parameter indicative of a permission setting of the tape file.

9. The system of claim 7, wherein the at least one security parameter comprises a parameter indicative of an owner of the tape file.

10. The system of claim 7, wherein the at least one security rule indicates an encryption standard.

11. The system of claim 7, wherein the program of instructions is further operable to:
identify the at least one storage parameter associated with the tape file, wherein the at least one storage parameter comprises a parameter indicative of a name of the tape file; and
determine whether to encrypt the tape file by applying the at least one storage rule to the at least one storage parameter to determine if the name of the tape file includes a term that is identified by the at least one storage rule as requiring encryption.

12. A non-transitory computer-readable medium encoded with logic, the logic being operable, when executed on a processor, to:
receive a request to store a tape file comprising backup data on a tape storage device;
maintain a set of storage rules that are defined by a backup product operable to provide storage management of the up backup data, the set of storage rules identifying selection criteria for determining whether to encrypt the tape file based on at least one storage parameter associated with the storage of the tape file comprising the backup data;
maintain a set of security rules identifying selection criteria for determining whether to encrypt the tape file based on at least one security parameter associated with a security profile associated with the tape file comprising the backup data, wherein the set of security rules are external to the set of storage rules and are defined by a security administrator, wherein the set of security rules identify whether the tape file should be encrypted based on who is allowed to access the file;
in response to applying the set of storage rules to the at least one storage parameter associated with the tape file, determine that the tape file should not be encrypted;
in response to applying the set of security rules to the at least one security parameter associated with the tape file, determine that the tape file should be encrypted based on a permission setting identifying who is allowed to access the file;

in response to applying both the set of storage rules and the set of security rules, encrypt the tape file such that preference is given to the at least one security rule defined by the security administrator over the at least on storage rule defined by the backup product where the set of storage rules identify that the tape file should not be encrypted and the set of security rules identify that the tap file should be encrypted; and store the tape file on the tape storage device.

13. The non-transitory computer-readable medium of claim 12, wherein the at least one security parameter comprises a parameter indicative of a permission setting of the tape file.

14. The non-transitory computer-readable medium of claim 12, wherein the at least one security parameter comprises a parameter indicative of an owner of the tape file.

15. The non-transitory computer-readable medium of claim 12, wherein the at least one security rule indicates an encryption standard.

16. The non-transitory computer-readable medium of claim 12, wherein the logic is further operable to:

identify the at least one storage parameter associated with the tape file, wherein the at least one storage parameter comprises a parameter indicative of a name of the tape file; and determine whether to encrypt the tape file by applying the at least one storage rule to the at least one storage parameter to determine if the name of the tape file includes a term that is identified by the at least one storage rule as requiring encryption.

17. The method of claim 2, wherein:

the parameter indicative of the permission setting of the tape file indicates that the tape file is read-only, and encrypting the file comprises encrypting the tape file in response to determining that the tape file is read-only.

18. The system of claim 8, wherein:

the parameter indicative of the permission setting of the tape file indicates that the tape file is read-only, and encrypting the file comprises encrypting the tape file in response to determining that the tape file is read-only.

19. The non-transitory computer-readable medium of claim 13, wherein:

the parameter indicative of the permission setting of the tape file indicates that the tape file is read-only, and the logic is operable to encrypt the tape file in response to determining that the tape file is read-only.

\* \* \* \* \*

UNITED STATES PATENT AND TRADEMARK OFFICE
CERTIFICATE OF CORRECTION

PATENT NO. : 8,429,424 B2  Page 1 of 1
APPLICATION NO. : 11/737873
DATED : April 23, 2013
INVENTOR(S) : Russell A. Witt et al.

It is certified that error appears in the above-identified patent and that said Letters Patent is hereby corrected as shown below:

In the Claims

Column 6, line 59 (claim 1, line 32) Replace "on" with -- one --

Column 6, line 63 (claim 1, line 36) Replace "tap" with -- tape --

Column 7, line 57 (claim 7, line 10) Change "up backup data" to -- backup data --

Column 8, line 13 (claim 7, line 33) Replace "on" with -- one --

Column 8, line 18 (claim 7, line 37) Replace "tap" with -- tape --

Column 8, line 46 (claim 12, line 8) Change "up backup data" to -- backup data --

Column 9, line 4 (claim 12, line 33) Replace "on" with -- one --

Column 9, line 8 (claim 12, line 37) Replace "tap" with -- tape --

Signed and Sealed this
Twenty-sixth Day of November, 2013

Margaret A. Focarino
*Commissioner for Patents of the United States Patent and Trademark Office*